United States Patent [19]

Oi et al.

[11] Patent Number: 5,488,445
[45] Date of Patent: Jan. 30, 1996

[54] LENS-FITTED PHOTOGRAPHIC FILM PACKAGE AND PRODUCTION METHOD THEREFOR

[75] Inventors: Nakao Oi, Kanagawa; Hiroshi Komatsuzaki, Tokyo, both of Japan

[73] Assignee: Fuji Photo Film Co., Ltd., Kanagawa, Japan

[21] Appl. No.: 406,802

[22] Filed: Mar. 20, 1995

Related U.S. Application Data

[60] Continuation of Ser. No. 172,247, Dec. 23, 1993, abandoned, which is a division of Ser. No. 849,536, Mar. 11, 1992, Pat. No. 5,343,265.

[30] Foreign Application Priority Data

Mar. 11, 1991 [JP] Japan ..................... 3-70567

[51] Int. Cl.[6] ..................... G03B 17/24
[52] U.S. Cl. ..................... 354/106; 354/222; 354/288
[58] Field of Search ..................... 354/75, 76, 105, 354/106, 221, 222, 288; 355/40, 41

[56] References Cited

U.S. PATENT DOCUMENTS

| | | | |
|---|---|---|---|
| 4,357,102 | 11/1982 | Taren et al. | 354/222 X |
| 4,500,183 | 2/1985 | Tanikawa | 354/21 |
| 4,884,087 | 11/1989 | Mochida et al. | 354/75 |
| 4,973,997 | 11/1990 | Harvey | 354/106 |
| 5,084,719 | 1/1992 | Hara et al. | 354/75 |
| 5,159,386 | 10/1992 | Taniguchi et al. | 355/41 X |

FOREIGN PATENT DOCUMENTS

| | | |
|---|---|---|
| 63-200822 | 12/1988 | Japan . |
| 3-39734 | 2/1991 | Japan . |
| 4-1528 | 1/1992 | Japan . |

*Primary Examiner*—Howard B. Blankenship
*Attorney, Agent, or Firm*—Young & Thompson

[57] ABSTRACT

Standard film packages and telephoto-type film packages and panoramic film packages are produced using the same standardized package bodies which are adapted to photograph full-size frames on 35-mm film. In the factory, each package body is loaded with a photographic film, and indicia of the type of the film package to be produced are provided on the photographic film or a cassette for containing the photographic film, as well as on the film package. When printing a photographic film having been loaded into such a standard film package, substantially the whole area of the full-size frame is printed to make a standard print, whereas printing of photographic films that have been loaded into the telephoto-type film package and the panoramic-type film package is performed such that only a partial area of the full-size frame is printed at different print magnifications which are larger than that used for standard prints. The fields of view in the viewfinders of the telephoto-type film package and the panoramic film package are changed from that of the standard film package, so as to correspond to the respective areas to be printed for making telephoto prints and panoramic prints.

29 Claims, 6 Drawing Sheets

LENS-FITTED PHOTOGRAPHIC FILM PACKAGE AND PRODUCTION METHOD THEREFOR

This application is a continuation of application Ser. No. 08/172,247, filed Dec. 23, 1993, now abandoned, which is a division of application Ser. No. 07/849,536, filed Mar. 11, 1992, now U.S. Pat. No. 5,343,265.

BACKGROUND OF THE INVENTION

1. Field of the Invention

The present invention relates to a method for producing various types of lens-fitted photographic film packages, by which production costs can be remarkably lowered. The present invention also relates to lens-fitted photographic film packages produced according to this method.

2. Related Art

Lens-fitted photographic film packages (hereinafter called simply film packages) are now on the market. Each such film package is a single-use throwaway camera that makes it possible to take pictures whenever desired without buying or carrying about an expensive and heavy camera. Recently, various types of film packages other than a standard film package with no flash unit have been known, including a film package with a flash unit, a film package for telephotography, a film package for panoramic photography and so forth, for example, from Japanese Laid-Open Utility Model Applns. Nos. 63-20082, 2-104340 (corresponding to U.S. Pat. No. 5,084,719) and 4-1528.

The film packages for telephotography and those for panoramic photography (hereinafter called simply telephoto-type film packages and panoramic film packages, respectively) disclosed in the above-mentioned publications, have different constructions, for example, different housings, different focal lengths of taking lenses and different exposure mechanisms from those of the standard film package, in accordance with the photography type. Therefore, various kinds of plastic molds for forming respective parts of the various types of film packages are necessary. Moreover, since the procedure of assembling of each type film package is different from the others, it is necessary to provide an individual assembly line for each type. Consequently, the variation of the film package militates against lowering the production cost.

OBJECTS OF THE INVENTION

In view of the foregoing, an object of the present invention is to provide more than two types film packages at a low cost.

Another object of the present invention is to minimize the production cost for various types film packages.

SUMMARY OF THE INVENTION

To achieve the above and other objects and advantages, the present invention uses the same standardized package bodies for producing at least two types of film packages, among them being standard type, telephoto type and panoramic type film packages. When making standard prints, telephoto prints and panoramic prints, the printing area of each picture frame and the print magnification are changed in accordance with the photography type.

In order to print the photographic film in accordance with the photography type of the film package in which the photographic film has been loaded, the photographic films and/or a film cassette containing the photographic films are provided with indicia as to the photography type of the associated film packages.

According to a preferred embodiment, the size of the viewfinder of the film package is changed in accordance with the photography type, such that the same scene as will be shown on a finished print will be viewed through the viewfinder.

The size of the viewfinder may be defined by an opening formed in an outer casing encasing the standardized package body which has a standardized viewfinder. The size of the viewfinder may also be defined by at least two types of mask pieces, either of which is fitted onto the front opening of the standardized viewfinder for producing the telephoto type film package or the panoramic film package.

In this way, at least three types of film packages can be assembled using almost the same parts. Therefore, the production cost is remarkably lowered.

BRIEF DESCRIPTION OF THE DRAWINGS

The above and other objects, features and advantages of the invention will become apparent from the following detailed description of preferred embodiments when read in connection with the accompanying drawings, wherein.

DETAILED DESCRIPTION OF THE PREFERRED EMBODIMENTS

Figure 1:
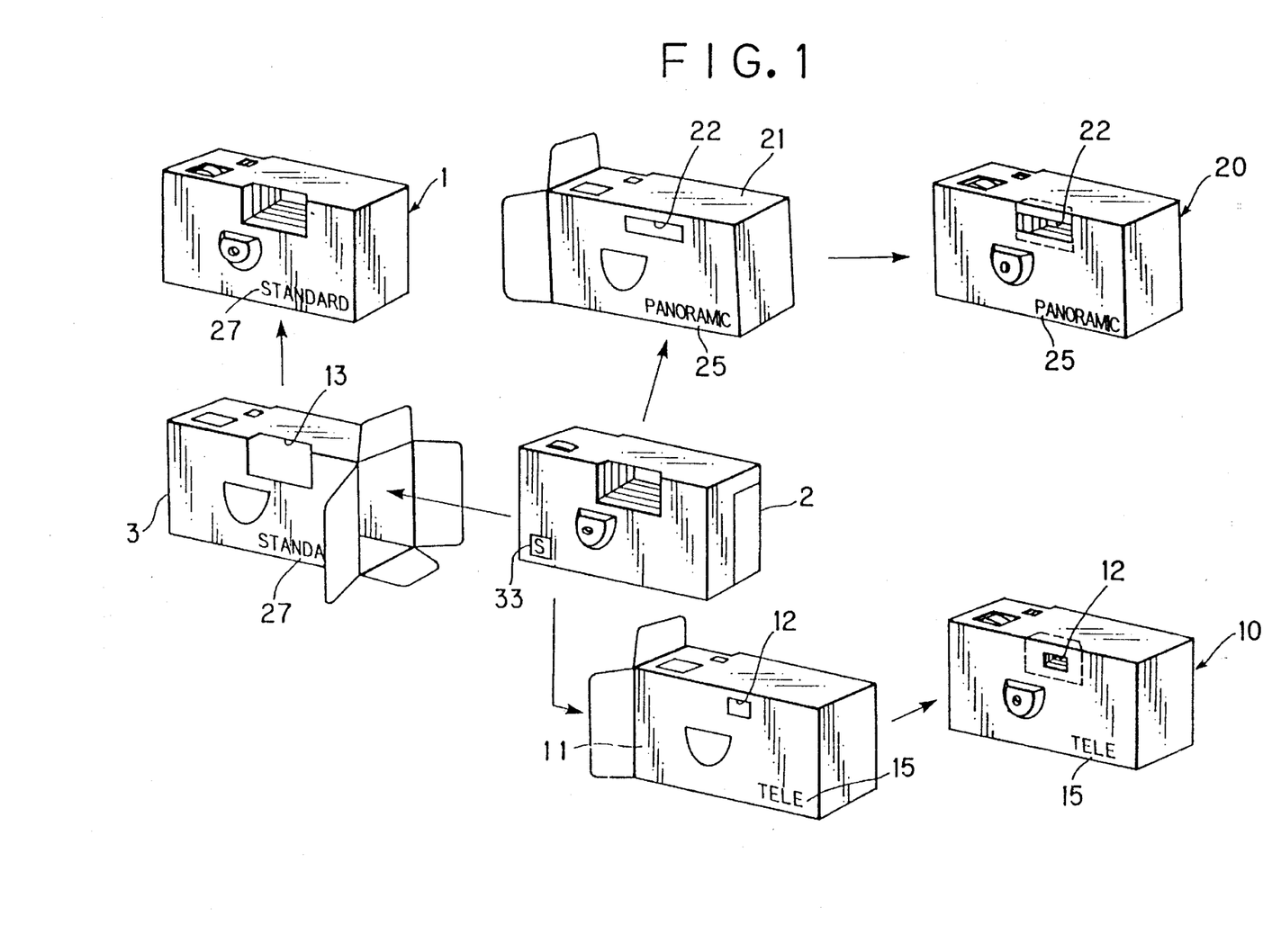
FIG. 1 is an explanatory view illustrating the theory of the present invention.

In FIG. 1, various types of film packages, for instance, standard film packages, telephoto-type film packages, and panoramic film packages are produced using the same package bodies but different ornamental outer casings. The outer casing of one type has a different viewfinder opening than another type of outer casing, such that the same scene as will be shown on an individual photographic print will be viewed through the viewfinder. However, because of the use of a standard package body, the pictures frames of all the different types of film packages will have the same size as a full-size frame (24×36 mm) of 35-mm film. Telephoto prints and panoramic prints are made by changing the print condition, such as the printing area to be printed within the full-size frame, print or paper size, and print magnification, in accordance with the photography type of the film package. In other words, the panoramic film package and the telephoto film package of the invention perform pseudo-panoramic photography and pseudo-telephotography, respectively.

Figure 2:
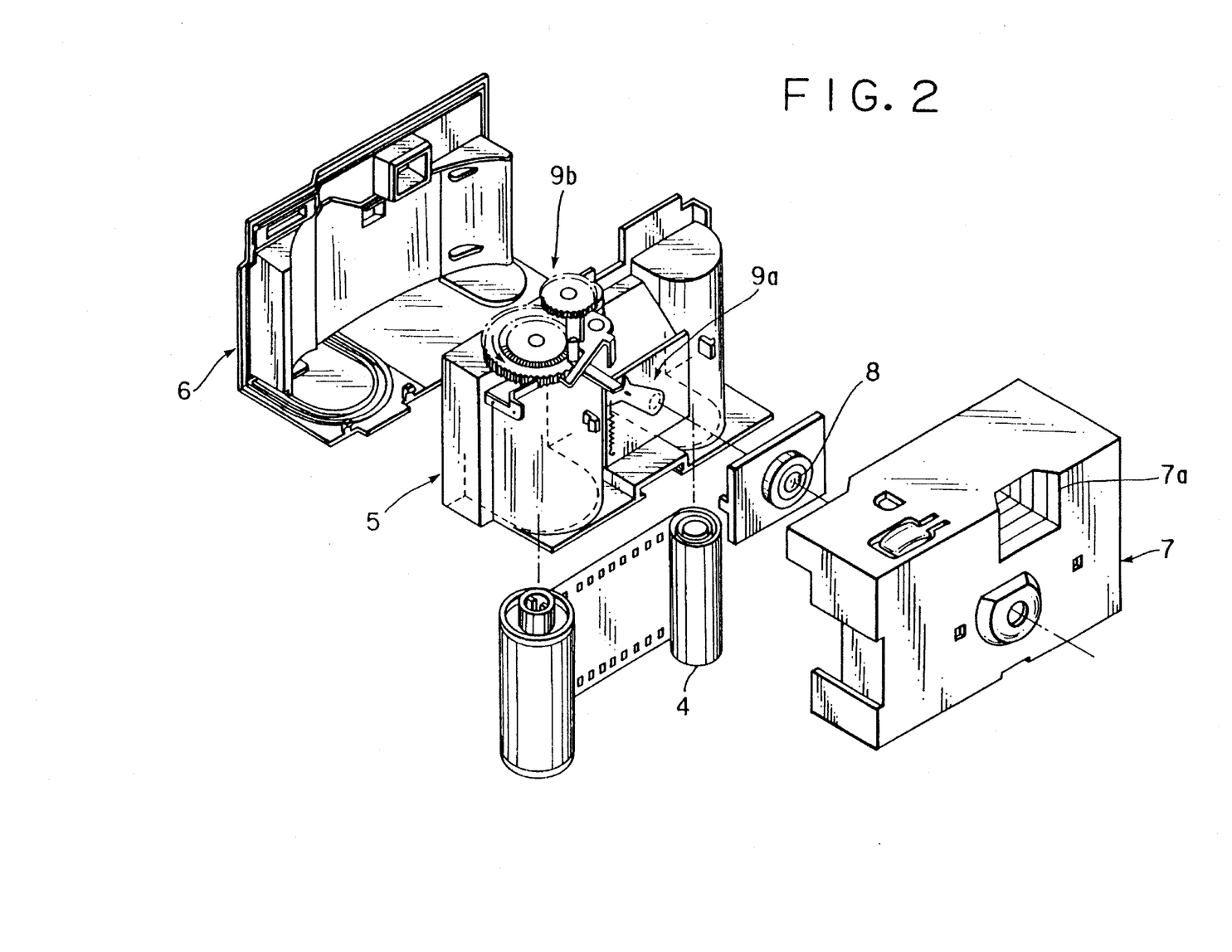
FIG. 2 is an exploded perspective view of a package body of a conventional film package, which is commonly used for producing various types of film packages.

As shown in FIG. 2, the package body 2 is comprised of a main body section 5 for accommodating a photographic film 4, a rear cover section 6 and a front cover section 7. A taking lens 8 is securely disposed between the main body section 5 and the front cover section 7. Simple exposure mechanisms, including a shutter mechanism 9a and a film advancing mechanism 9b, are mounted on the main body section 5. Since the construction and the operation of the package body 2 are disclosed in U.S. Pat. No. 4,884,087 among others, a detailed description thereof can be omitted.

According to one of the embodiments of FIG. 1, the same package body 2 is used for producing a standard film package 1, a telephoto-type film package 10 or a panoramic film package 20. In order to produce the standard film package 1, the package body 2 is encased in a box-shaped outer casing 3 which has an opening 13 corresponding to a viewfinder window 7a of the package body 2, as is conventional.

When producing the telephoto-type film package 10, the package body 2 is encased in an outer casing 11 with a small viewfinder opening 12 which is proportionally reduced in height and in width relative to the opening 13, as is shown by dashed lines. The telephoto-type viewfinder opening 12 corresponds to a photographic field covered by telephotography. The outer casing 11 for the telephoto type also has indicia in the form of markings 15 for indicating the type of the film package to be encased therein. For instance, the indicia 15 is literal information "TELE" which is printed directly on the outer surface of the outer casing 1. The indicia 15 may be applied as a label on the outer casing.

On the other hand, when producing a panoramic film package 20, the package body 2 is encased in an outer casing 21 which has a viewfinder opening 22 for panoramic photography. The size of the viewfinder opening 22 is reduced in height relative to the standard viewfinder opening 13, as is shown in dashed lines, so as to correspond to a horizontally wide panoramic photographic field. The outer casing 21 for the panoramic film package 20 also has indicia 25, for instance, "PANORAMIC", for distinguishing the type of the film package to be encased therein.

It is to be noted that the viewfinder openings 12 and 22 are smaller in size than the opening 13 because portions of the outer casing 3 or 21 extend inwardly of opening 13 beyond those portions of package body 2 that border opening 13. It is those inwardly extending portions of the outer casing that constitute viewed field defining elements of the present invention.

The outer casing 3 for the standard film package 1 may also have indicia 27, for instance, "STANDARD" for easy identification.

Figure 3A:
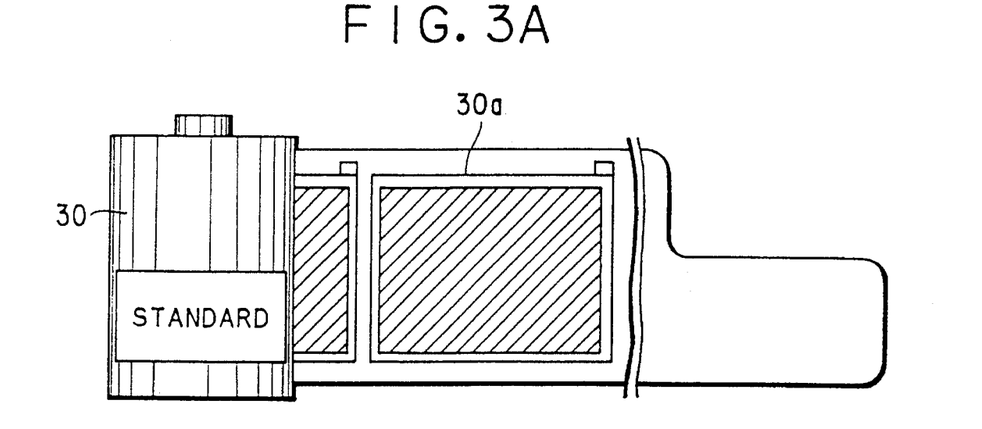
FIGS. 3A, 3B and 3C show film cassettes for a standard film package, for a telephoto type film package and for a panoramic film package, respectively.
Figure 3B:
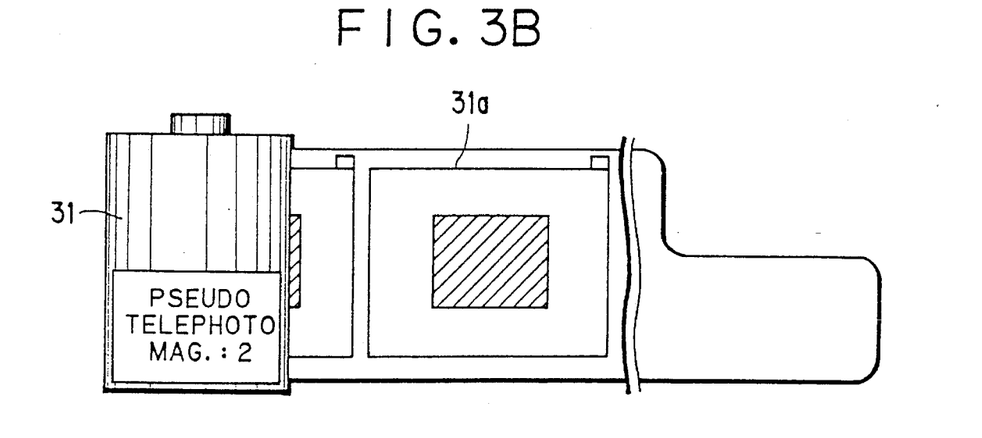
Figure 3C:
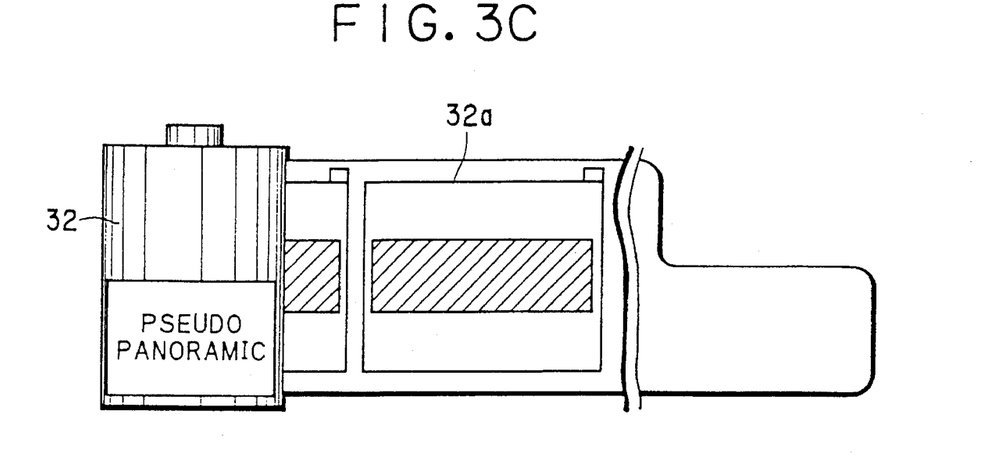

FIGS. 3A, 3B and 3C show film cassettes 30, 31 and 32 to be loaded in the package bodies 2, respectively for producing the standard film package 1, the telephoto-type film package 10 and the panoramic film package 20. The film cassettes 30, 31 and 32 are provided with indicia, for instance, "STANDARD", "PSEUDO TELEPHOTO MAG.: 2" and "PSEUDO PANORAMIC" respectively, for distinguishing the type of the film package in which the film cassette has been loaded. Such a distinction is necessary for making prints of the picture frames or negative images corresponding to the type of film package, as described in more detail below.

After being loaded with one of the three types of film cassettes 30, 31 and 32, the package body 2 is provided with indicia as to the type of the film cassette loaded therein, so as to properly encase the package body 2 in the outer casing 3, 11 or 21 that corresponds to the loaded film cassette 30, 31 or 32, respectively. FIG. 1 shows an example of the indicia in the form of a label 33 removably applied to the package body 2. The label 33 bears a letter "S" representative of the standard type.

The indicia may be provided on the package bodies 2 before the film cassettes 30, 31 and 32 are loaded, so as to permit loading the film cassettes 30, 31 and 32 into the package bodies 2 in accordance with the indicia thereon.

Figure 4:
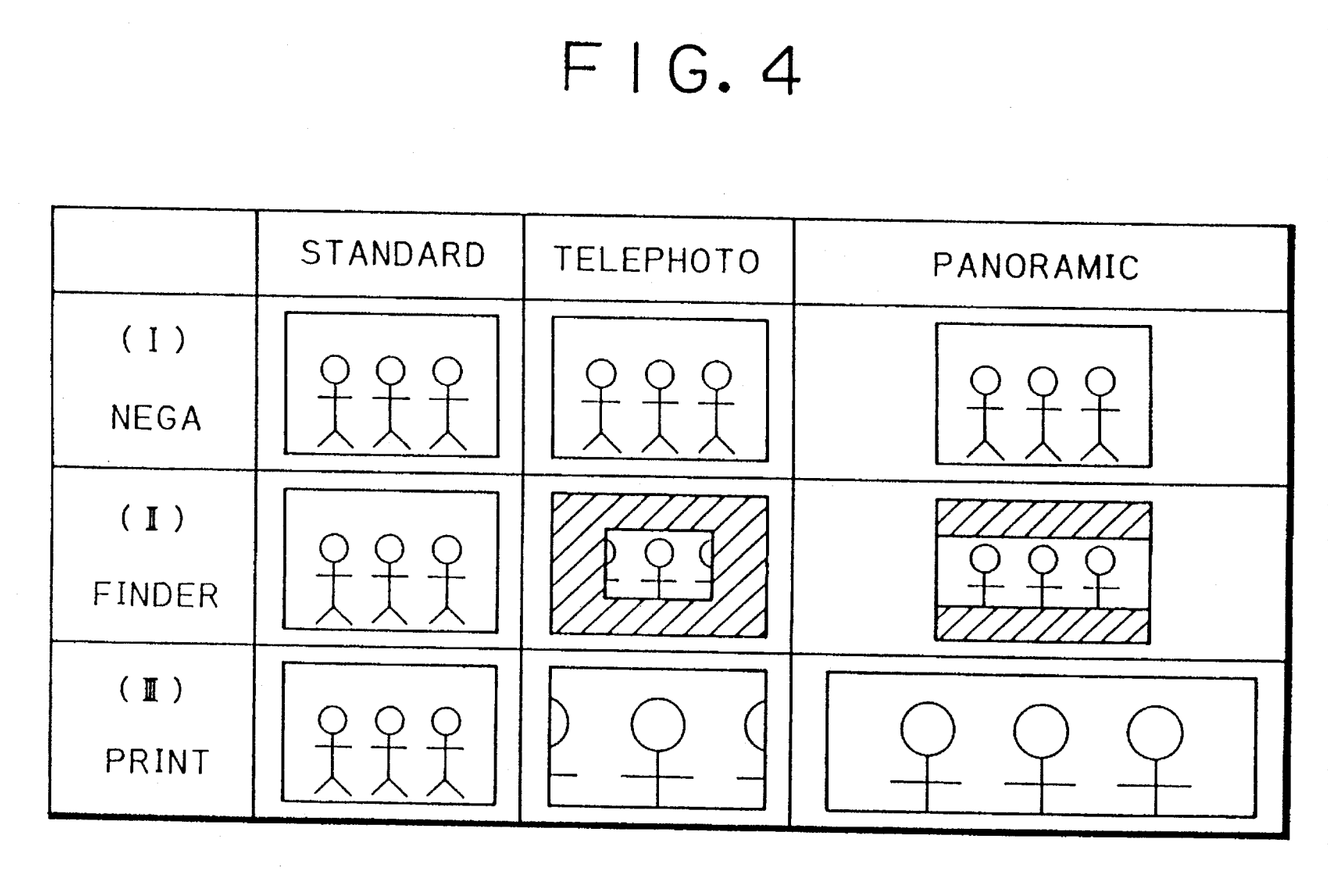
FIG. 4 is a table illustrating examples of the negative images, photographic fields viewed through the viewfinders, and finished prints, with respect to the standard, telephoto-type and panoramic film packages.

Because the telephoto-type film package 10 and the panoramic film package 20 produced in this way have the same taking lens 8 and the same exposure mechanism as the standard film package 1, the size of the picture frames of both types of film packages 10 and 20 will be equal to a full-size picture frame, as in standard photography, as shown by 30a, 31a and 32a in FIGS. 3A, 3B and 3C, and also the table of FIG. 4.

When the exposure of the photographic film 4 is completed, the film package 1, 10 or 20 is forwarded as a whole to a photofinishing laboratory for developing and printing, without the need for removal of the photographic film 4. In the photofinishing laboratory, the film cassettes 30, 31 and 32 containing the exposed film are removed from the package bodies 2. Although the picture frames recorded on the photographic film of the film cassettes 30, 31 and 32 are all the same size (24×36 mm), because there are information of the photography type on the respective film cassettes 30, 31 and 32, as shown in FIGS. 3A, 3B and 3C, the actual prints will be made in accordance with the designated photography type, according to the indicia.

In order to make standard prints (e.g. 89×127 mm) from the film cassette 30, the picture frame 30a is printed at a predetermined standard print magnification using a negative mask that substantially corresponds to the full-size picture frame 30a, as is conventional. The hatched area in FIG. 3A shows the printing area. Therefore, it may be possible to omit the information of the photography type from the film cassette 30 for the standard type.

When making panoramic prints from the film cassette 32, a mask is placed on the picture frame 32a to be printed, so as to mask out the upper and lower areas of the picture frame 32a, corresponding to the field of view through the panoramic viewfinder opening 22, as is shown in FIG. 4, (II). Therefore, only a horizontally elongated middle area (12×36 mm), that is hatched in FIG. 3C and contains the same scene as viewed through the viewfinder of the panoramic film package 20, is used as a pseudo-panoramic original for making a panoramic print as shown in FIG. 4 (III). The size of the panoramic print may be equal to the size of conventional panoramic prints, and the print magnification therefor is determined according to the area to be printed within the picture frame 32a and the print size. Such a pseudo-panoramic printing method is disclosed, for example, in U.S. Pat. No. 4,357,102.

Printing of the film cassette 31 for telephotography is performed in a similar way as for the above-described pseudo-panoramic printing. A negative mask is used for masking out a peripheral area of the picture frame 31a corresponding to the field of view through the viewfinder opening 12. Thereby, only an unmasked area, which is hatched in FIG. 3B and contains the same scene as viewed through the viewfinder of the telephoto type film package 10 as is shown in FIG. 4 (II), is printed at an appropriate printing magnification that is larger than the standard print magnification. As a result, a print of the same size as the standard print, but containing an enlarged image is obtained, as is shown in FIG. 4, (III). This printing method therefore constitutes pseudo-telephoto printing.

Although the described telephoto embodiment relates to a case wherein the print magnification is increased by a factor of two over the standard print magnification, it is possible to designate another telephoto print magnification, such as a factor three or more. In those cases, the size of the viewfinder opening 12 should be varied in inverse proportion to the telephoto print magnification.

Pseudo-telephoto printing as well as pseudo-panoramic printing may be performed according to another method as disclosed in U.S. Pat. No. 4,583,831.

The indicia as to photography type, such as "STANDARD", "PSEUDO-TELEPHOTO MAG : 2" or "PSEUDO-PANORAMIC", may be provided on a label adhered to the outer periphery of the film cassette 30, 31 or 32. Such a label displaying the indicia may be adhered to the film leader. However, if the label were to become peeled off before printing, it would be impossible to distinguish the photography type of the film cassette. Moreover, when making extra prints form a developed photographic film, it would be impossible to know the photography type of the film package. Therefore, it may be preferable to previously expose parts of the photographic films according to the designated photography type, such that only the areas that are hatched in FIGS. 3A, 3B and 3C remain unexposed.

Figure 5A:
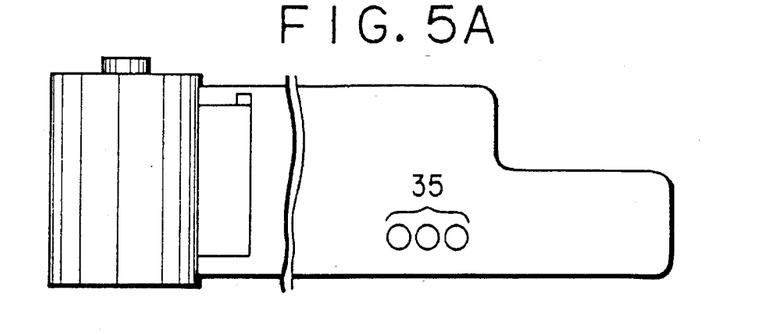
FIGS. 5A, 5B, 5C and 5D show other embodiments of film cassettes having indicia thereon as to the type of film package.
Figure 5B:
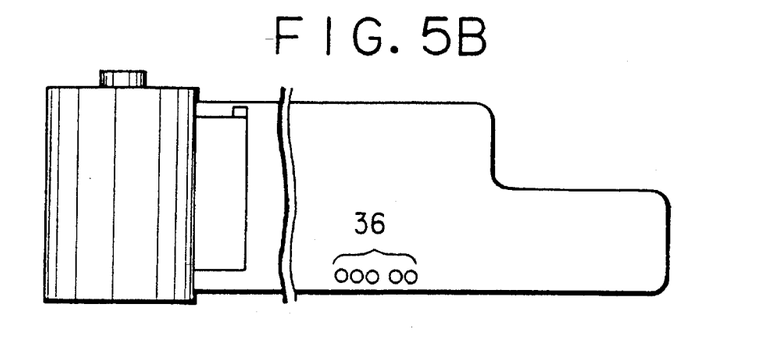
Figure 5C:
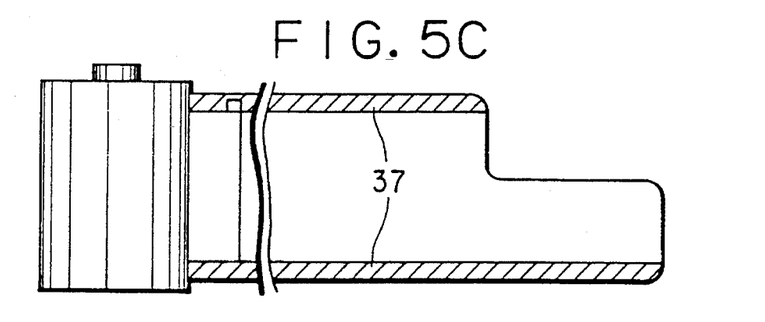
Figure 5D:
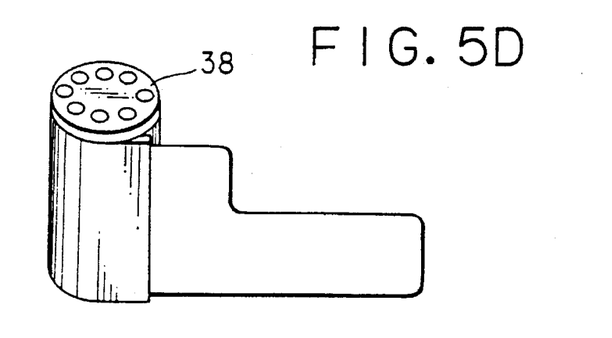

In addition to the above-described visually distinguishable indicia, it is also possible to provide mechanically detectable data on the photographic film or in the film cassette, so as automatically to distinguish the designated photography type. For example, it is possible to provide a mechanically readable punch code 35 or an optically readable dot pattern 36 on the photographic film, as shown in FIGS. 5A and 5B respectively. It is also possible to provide magnetic recording tracks 37 on the side edges of the film, as shown in FIG. 5C. It may be possible to provide a transparent magnetic recording layer on the entire rear surface of the photographic film. Alternatively, the photography type data may be stored in an IC memory 38 provided on the film cassette.

Figure 6:
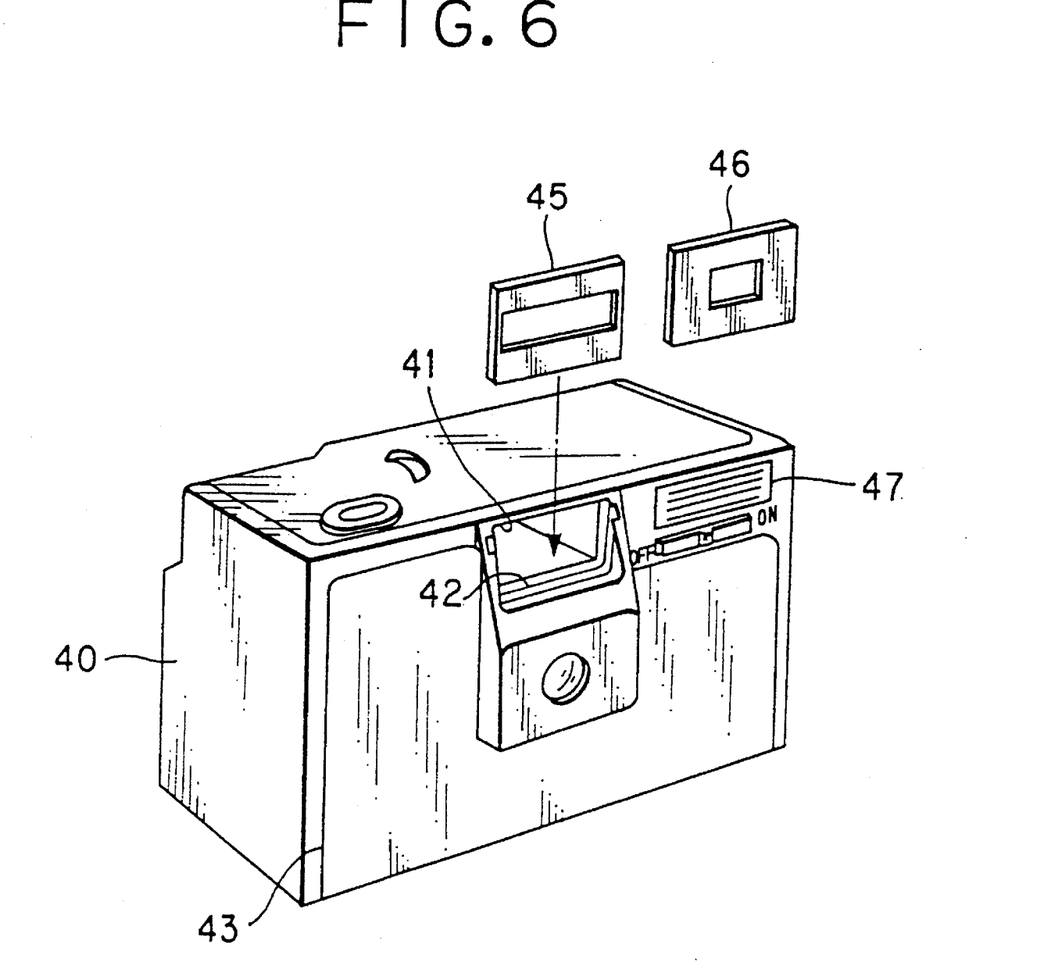
FIG. 6 is a film package according to another embodiment of the present invention.

FIG. 6 shows another embodiment of the invention, wherein a film package 40 is not encased in an outer casing, but instead, ornamental paper 43 is wrapped around the film package 40 except the opposite end walls thereof. The ornamental paper 43 has indicia printed thereon, for indicating the photography type of the film package. A film package of this type is already on the market.

According to the invention, the film package 40 has a viewfinder opening 41 which is formed along the front margins thereof with a groove 42, as shown in FIG. 6. A panoramic mask 45 or a telephoto mask 46 can be fitted into the front of the viewfinder opening 41 by sliding the mask 45 or 46 into the groove 42.

In order to produce a panoramic film package, the panoramic mask 45 is fitted and secured to the front of the viewfinder opening 41, and thereafter, a film cassette with information designating "pseudo-panoramic photography" is loaded into the film package 40. When producing a telephoto film package, the telephoto mask 46 is fitted and secured to the front of the viewfinder opening 41, and thereafter, a film cassette with information designating "pseudo-telephotography" is loaded into the film package 40. When producing a standard film package, it is necessary only to load a standard film cassette into the film package 40 without the need to fit any mask onto the viewfinder opening 41.

In the FIG. 6 embodiment, it is desirable to load the film cassette after emplacing the viewfinder mask, so as to avoid loading of a wrong film cassette.

As is shown by the film package 40, the invention is applicable to producing various types of film packages with flash units 47. This is of course applicable also to the first embodiment. It may be possible to provide different front cover sections for the respective types, instead of fitting a mask 45 or 46 to the viewfinder 41. Such sections, as well as the masks 45 and 46, constitute further embodiments of viewed field defining elements of the present invention.

In the above-described embodiments, the size of the viewfinder openings is changed according to the type of photography which is designated by the indicia on the film cassette and/or the data on the photographic film, such that the scene viewed through the viewfinder coincides with the scene of the finished print. However, it may be possible to omit adapting the viewfinder openings to a panoramic size photographic field or a telephoto size photographic field. Also in this case, the indicia as to the photography type, such as "pseudo-panoramic" or "pseudo-telephoto" are indispensably provided on the film cassettes and/or the photographic films, as well as on the outer casings.

Although the present invention has been described with respect to a method for producing three types of film packages, it is possible to apply the invention to the production of only two types of film packages, such as standard and telephoto type film packages, or standard and panoramic film packages.

Thus, the present invention is not to be limited to the above-described embodiments, but on the contrary, various modifications may be possible within the scope and spirit of the appended claims.

What is claimed is:

1. A lens-fitted photographic film package which contains a roll of photographic film, and has a taking lens, an exposure mechanism and a film winding mechanism which are adapted to photograph picture frames of a standard size, and which has a construction unsuitable for repeated film loading, said lens-fitted photographic film package comprising:

a light-tight cassette for winding up said photographic film therein after exposure;

visible indicia for indicating only one photography type other than standard photography type, said visible indicia being disposed on an outer surface of said lens-fitted photographic film package;

second indicia for indicating the same photography type as the type indicated by said visible indicia, said second indicia being prerecorded on one of said light-tight cassette and said photographic film prior to assembly of said photographic film in said film package and being adapted to be utilized for determining a format of photographic prints to be made from said standard size photographic picture frames in correspondence with the photography type indicated by said visible indicia; and a view field defining element fixedly disposed for defining a single viewed field through a standard size viewfinder on said package, such that said viewed field corresponds to a partial area of said standard size photographic picture frame to be printed corresponding to said photography type other than standard photography type, said second indicia having information of said partial area to be used for making said photographic prints.

2. A lens-fitted photographic film package as recited in claim 1, further comprising an outer casing for encasing said lens-fitted photographic film package therein, said view field defining element comprising an opening formed in said outer casing, margins of said opening masking a portion of the field of view of said standard size viewfinder.

3. A lens-fitted photographic film package as recited in claim 2, wherein said outer casing has visual indicia thereon indicating the type of said view field defining element.

4. A lens-fitted photographic film package as recited in claim 1, wherein said view field defining element is a mask attachable to a front opening of said viewfinder.

5. A lens-fitted photographic film package as recited in claim 1, wherein said other photography type is telephoto photography.

6. A lens-fitted photographic film package as recited in claim 1, wherein said other photography type is panoramic photography.

7. A lens-fitted photography film package as recited in claim 1, wherein one of said indicia is visual information provided on an outer periphery of said light-tight cassette.

8. A lens-fitted photography film package as recited in claim 1, wherein one of said indicia is a punch code formed in said photographic film.

9. A lens-fitted photographic film package as recited in claim 1, wherein one of said indicia is a dot pattern provided on said photographic film.

10. A lens-fitted photographic film package as recited in claim 1, wherein one of said indicia is data magnetically recorded on said photographic film.

11. A lens-fitted photographic film package as recited in claim 1, wherein one of said indicia is data electrically stored in a memory mounted on said light-tight cassette.

12. Method for producing prints other than standard photographic prints, using a lens-fitted photographic film package which has a construction unsuitable for repeated film loading, comprising the steps of:

using a package body previously loaded with photographic film withdrawn from a light-tight cassette in said body, said body having a taking lens, an exposure mechanism and a film winding mechanism which are adapted to photograph picture frames of a standard size;

combining said package body with visible indicia disposed on an outer surface of said lens-fitted photographic film package which indicates only one photography type other than standard photography type, providing, prior to any exposure of said photographic film, second indicia for indicating the same photography type as the type indicated by said visible indicia, said second indicia being disposed on one of said light-tight cassette and said photographic film and being adapted to be utilized for determining a format of photographic prints to be made from said standard size photographic picture frames in correspondence with the photography type indicated by said visible indicia;

exposing a photographic film by said standard type lens-fitted photographic film package while viewing the field of view to be photographed through a view field defining element defining a viewed field through a standard size viewfinder on said package, such that said viewed field corresponds to a partial area of said standard size photographic picture frame to be printed corresponding to said photography type other than standard photography type, and making enlarged prints from said exposed photographic film from only a portion of said frames of standard size of said exposed film, according to the indication of said second indicia.

13. A method as recited in claim 12, wherein said other photography type is telephotography.

14. A method as recited in claim 12, wherein said other photography type is panoramic photography.

15. A method as recited in claim 12, further comprising the step of providing indicia which indicates said other photography type, on one of said film and a cassette containing said film.

16. A method as recited in claim 12, further comprising the step of providing a view field defining element with said package body, so as to make a view field of each lens-fitted photographic film package correspond to said portion to be printed within said standard size picture frame.

17. A method as recited in claim 16, wherein said view field defining element combining step includes fitting a mask to a front opening of a viewfinder of said package body, said mask having an opening corresponding to said area to be printed.

18. A method for producing a lens-fitted photographic film package which has a construction unsuitable for repeated film loading, comprising the steps of:

providing a first indicia on one of a photographic film and a cassette containing said photographic film, for indicating a photography type other than standard photography type;

loading said photographic film in a package body having a taking lens, an exposure mechanism and a film winding mechanism which are adapted to photograph picture frames of a standard size, said package body also having a groove receiving a viewed field defining element for defining a viewed field through a standard size viewfinder on said package body, such that said viewed field defining element corresponds to a partial area of a standard size photographic picture frame to be printed, said partial area corresponding to said photography type other than standard photography type; and wrapping said package body in a wrapper which is provided with a visible second indicia indicating the same photography type as the type indicated by said first indicia.

19. A method as recited in claim 18, wherein said other photography type is telephotography.

20. A method as recited in claim 18, wherein said other photography type is panoramic photography.

21. A lens-fitted photographic film package which contains a roll of photographic film, and has a taking lens, an exposure mechanism and a film winding mechanism which are adapted to photograph picture frames of a standard size, said film package further comprising a standard size viewfinder for viewing a standard size field of view which is the same as a said photographic picture frame of said standard size, and an outer casing enclosing said lens-fitted photographic film package therein, said outer casing having an opening formed therein that overlies said standard size viewfinder, margins of said opening extending inwardly of said opening to mask a portion of the field of view of said standard size viewfinder.

22. A lens-fitted photographic film package as claimed in claim 21, there being indicia exposed on an outer surface of said outer casing and on at least one of said light-tight cassette and said photographic film, said indicia indicating a photography type other than standard photography type, the thus-indicated photography type being the same as a field of view visible to the user of the film package through said viewfinder masked by said margins of said opening.

23. A lens-fitted photographic film package as claimed in claim 22, wherein said other photography type is telephotography.

24. A lens-fitted photographic film package as claimed in claim 22, wherein said other photography type is panoramic photography.

25. A lens-fitted photographic film package as claimed in claim 22, wherein said indicia comprise visible information provided on an outer periphery of said light-tight cassette.

26. A lens-fitted photographic film package as claimed in claim 22, wherein said indicia comprise a punch code formed in said photographic film.

27. A lens-fitted photographic film package as claimed in claim 22, wherein said indicia comprise a dot pattern formed on said photographic film.

28. A lens-fitted photographic film package as claimed in claim 22, wherein said indicia comprise data magnetically recorded on said photographic film.

29. A lens-fitted photographic film package as claimed in claim 22, wherein said indicia are data electronically stored in a memory mounted on said light-tight cassette.

* * * * *